(12) United States Patent
Ferlitsch

(10) Patent No.: US 7,999,951 B2
(45) Date of Patent: Aug. 16, 2011

(54) DIRECT PRINT HANDLING OF NATIVE AND NON-NATIVE DATA FORMATS

(75) Inventor: Andrew Rodney Ferlitsch, Camas, WA (US)

(73) Assignee: Sharp Laboratories of America, Camas, WA (US)

(*) Notice: Subject to any disclaimer, the term of this patent is extended or adjusted under 35 U.S.C. 154(b) by 1264 days.

(21) Appl. No.: 11/618,483

(22) Filed: Dec. 29, 2006

(65) Prior Publication Data

US 2008/0158581 A1 Jul. 3, 2008

(51) Int. Cl.
*G06F 3/12* (2006.01)
*G06K 15/00* (2006.01)

(52) U.S. Cl. .................. 358/1.13; 358/1.15

(58) Field of Classification Search ............. 358/1.1, 358/3.28, 1.9, 1.13, 1.14, 1.15, 1.18, 400, 358/500; 709/202, 203, 208, 223; 707/102
See application file for complete search history.

(56) References Cited

U.S. PATENT DOCUMENTS

| | | | |
|---|---|---|---|
| 5,819,014 A | 10/1998 | Cyr et al. | |
| 6,636,891 B1 | 10/2003 | LeClair et al. | |
| 6,952,831 B1 * | 10/2005 | Moore | 719/327 |
| 2002/0112037 A1 | 8/2002 | Koss | |
| 2002/0138564 A1 | 9/2002 | Treptow et al. | |
| 2002/0140958 A1 | 10/2002 | Lester | |
| 2002/0186393 A1 | 12/2002 | Pochuev et al. | |
| 2003/0011814 A1 | 1/2003 | Nunokawa et al. | |
| 2003/0030841 A1 | 2/2003 | Parry | |
| 2003/0095284 A1 | 5/2003 | Parry | |
| 2003/0137693 A1 | 7/2003 | Nishio | |
| 2003/0147098 A1 | 8/2003 | Gnutzmann | |
| 2004/0083430 A1 | 4/2004 | Boonen | |
| 2004/0179218 A1 | 9/2004 | Wissenbach | |
| 2004/0190032 A1 * | 9/2004 | Ferlitsch | 358/1.13 |
| 2004/0205458 A1 | 10/2004 | Hwang et al. | |
| 2004/0207863 A1 | 10/2004 | Christiansen | |
| 2005/0046886 A1 * | 3/2005 | Ferlitsch | 358/1.13 |
| 2005/0146742 A1 * | 7/2005 | Gregory | 358/1.15 |
| 2005/0157330 A1 * | 7/2005 | Giuliano | 358/1.15 |
| 2008/0091636 A1 * | 4/2008 | Ferlitsch | 707/1 |
| 2008/0112013 A1 * | 5/2008 | Ferlitsch et al. | 358/3.28 |

FOREIGN PATENT DOCUMENTS

| | | |
|---|---|---|
| EP | 0 864 965 A1 | 9/1998 |
| EP | 1 267 254 A2 | 12/2002 |
| EP | 1 338 952 A2 | 8/2003 |
| EP | 1 422 632 A2 | 5/2004 |
| JP | 2002244821 A | 8/2002 |
| JP | 2002358273 A | 12/2002 |
| WO | WO 02/084928 A2 | 10/2002 |
| WO | WO 2004/070617 A1 | 8/2004 |

* cited by examiner

*Primary Examiner* — Gabriel I Garcia
(74) *Attorney, Agent, or Firm* — Michael Blaine Brooks, PC; Pejman Yedidsion; David Ripma

(57) ABSTRACT

Methods of, and devices for, image processing of input data, directed to an imaging device, where a method comprises: (a) generating a spool shell based on received job setting information for received input data; (b) determining if the received input data is native to the imaging device; and (c) if the received input data is not native to the imaging device, then (i) converting the received input data into a native converted data, and (ii) generating a spool job by encapsulating the converted data within the generated spool shell.

13 Claims, 11 Drawing Sheets

DIRECT PRINT HANDLING OF NATIVE AND NON-NATIVE DATA FORMATS

BACKGROUND

1. Technical Field—Field of Endeavor

The invention, it its several embodiments, pertains to direct submission of input data, particularly to direct submission of print data with native and non-native formats to a target imaging device.

2. State of the Art

An imaging device, such as a printer, may be directed to render an output based on a received input data. Such input data may be in various formats, such as printer-ready format and device-independent format. Considering that, device-independent data typically does not have printer control instructions, ways of enabling a user to specify job settings for such data and particular to the imaging device are highly desirable. Printer-ready data, however, typically contains printer-control settings. If job-wide settings are specified, for example, via a spool header, it is possible that one or more printer-control instructions in the printer-ready data will potentially be in conflict with spool header information. Ways of minimizing or removing such potential conflict are also highly desirable. In some cases, an imaging device may receive a spool file to be rendered. In these cases, one or more spool header information may not be native to the imaging device. Ways of specifying spool header information, such as job settings, native to the imaging device are also desirable. Some imaging systems today distribute the load between a host and the imaging device, e.g., a printer. Ways of distributing such load within these systems, e.g., to minimize or reduce the raster image processing requirements on the printer, are also desirable.

SUMMARY

In a first aspect, a method of image processing of input data, directed to an imaging device, is provided. The method includes the steps of receiving the input data, receiving job setting information for the imaging device, generating a spool shell based on the received job setting information, determining if the input data is native to the imaging device, if the input data is not native to the imaging device—then generating a spool job by encapsulating the converted data within the generated spool shell, and transmitting the spool job for output by the imaging device.

In another aspect, a device adapted to be operably coupled to an imaging device is provided. The device includes an imaging initiation module, a type determination module, and a conversion module. The imaging initiation module is adapted to receive input data and information designating the imaging device, receive job setting information for the imaging device, and generate a spool shell based on the received job setting information. The type determination module is adapted to determine whether the input data is a printer-ready data or a device-independent data, and determine whether the input data is in encapsulated form. The conversion module is adapted to—if the input data is in encapsulated form, filter an old spool shell encapsulating the input data; if the input data is printer-ready data, filter one or more control instructions from the input data; determine if the input data is native to the imaging device; if the input data is non-native to the imaging device, convert the input data to a converted input data with a converted format natively supported by the imaging device and generate a spool job by encapsulating the converted input data in the generated spool shell; and if the input data is native to the imaging device, generate a spool job by encapsulating the input data in the generated spool shell.

In another aspect, a system is provided. The system includes a client and a database. The client is adapted to be in operable communication with an imaging device, and wherein the client includes a direct print utility (DPU) adapted to associate a designation of the imaging device and input data. The database includes format information supported by the imaging device. The client DPU is further adapted to format a spool job based on the designated imaging device and a format returned from the database, and is further adapted to determine the type of the input data, convert the input data according to type, and encapsulate the converted input data within the formatted spool job.

In another aspect, a method of rendering input data directed to an imaging device is provided. The method includes the steps of generating a spool shell based on the imaging device and information returned from a database comprising information of formats supported by the imaging device; characterizing the input data wherein: if the input data is a device-independent data and not native to the target imaging device, then converting the non-native device-independent input data into a converted native input data supported by the imaging device; and if the input data is a printer-ready data and not native to the target imaging device, then filtering the printer-ready data by filtering job wide settings via format-specific parsing and converting the filtered printer-ready data to a converted native data with a native format selected from the group of: a device independent format and a printer ready format; and encapsulating the converted input data within the spool shell to generate a spool job.

BRIEF DESCRIPTION OF THE DRAWINGS

For a more complete understanding of the present invention and for further features and advantages, reference is now made to the following description taken in conjunction with the accompanying drawings, in which.

DETAILED DESCRIPTION OF THE EXEMPLARY EMBODIMENTS

Figure 1:
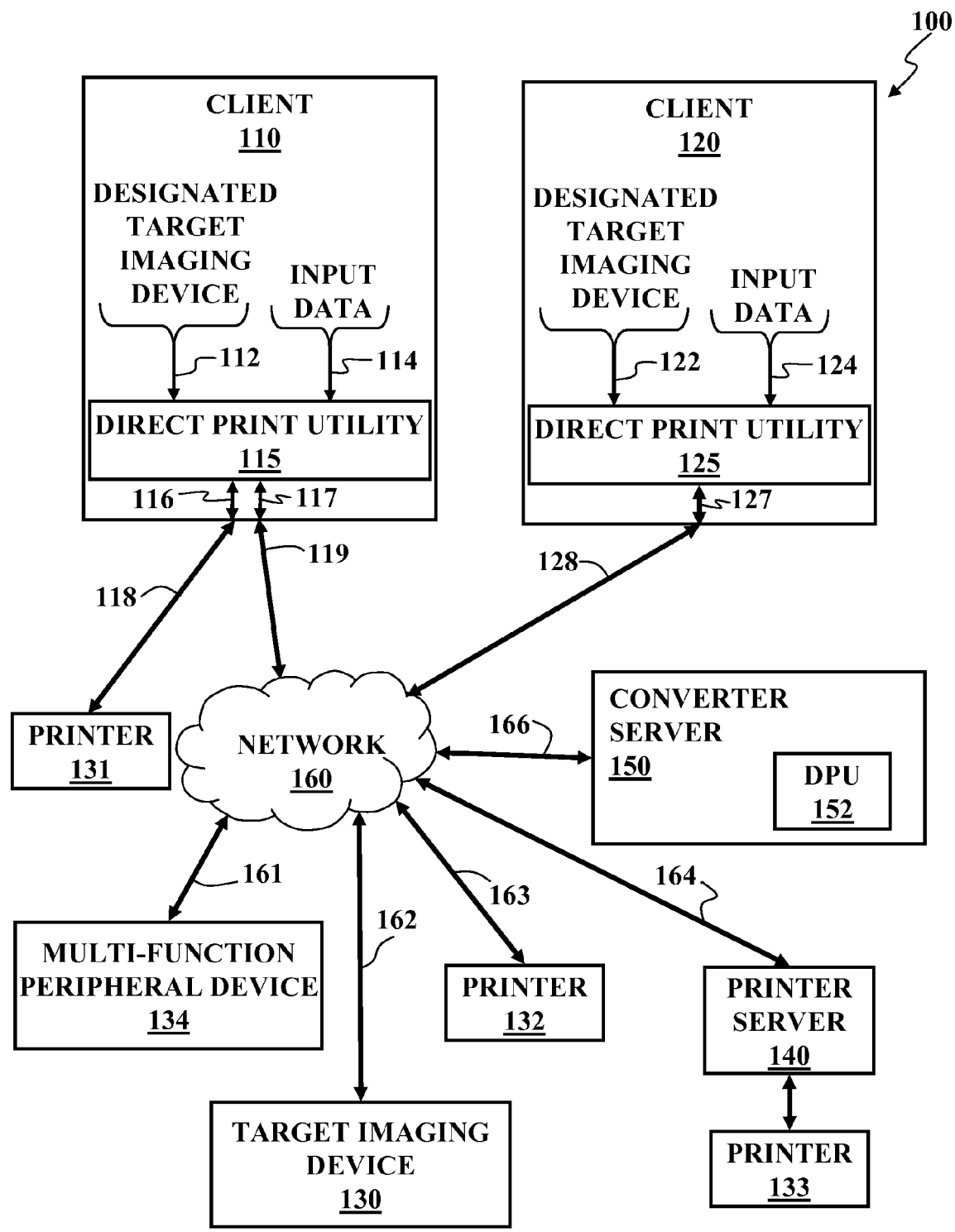
FIG. 1 is a functional block diagram illustrating an exemplary system embodiment of the present invention.

Some embodiments of the present invention relate to direct print utilities, wherein certain input data are typically directly transmitted or submitted to a designated target imaging device, such as a printer. The printer typically utilizes a local interpreter adapted to process this input data, typically without further format conversion or translations, and to perform a low raster image processing based on the input data. An exemplary operating environment may include one or more clients and/or one or more servers, each running a direct print utility (DPU) that may be invoked for the direct submission of input data. A DPU of the present invention, at a client, at a server, or a combination thereof, typically classifies the input data as to whether the data is device-independent data or printer-ready data. The input data is also further classified as to whether the data is native or non-native to a target imaging device. Typically, a native device-independent data is encapsulated within a spool shell, e.g., consisting of a spool header and a spool footer, that is based on selected or defined job settings. A non-native device-independent data is typically converted to a native device-dependent or device-independent data and then encapsulated within a spool shell. A native printer-ready data is typically filtered and then encapsulated within a spool shell, while a non-native printer-ready data is typically filtered, converted to a native format, and then encapsulated within a spool shell. An encapsulated input data, e.g., a spool file, is typically filtered such that the spool header and footer of the input data are discarded and then replaced by a new spool shell compatible with the target device. The extracted input data from this spool file may then be processed depending on the format type of the extracted input data.

Furthermore, the invention in its several embodiments includes methods of, and systems and devices for, the direct printing of input data, wherein the data may be arranged, as appropriate, in a format that, when taken together with format conversion, provides a path of reduced processing over the state of the art. The reduced processing of the input data may be a path wherein the data may be processed the most efficiently, i.e., the path having the least or no additional processing of the data, whether at a client, at a server, at a printer, or a combination thereof. Some embodiments may also engage a conversion server or a printer server, or both where data format conversions may be performed.

In other embodiments, job settings may be specified typically without conflict with previously defined information, e.g., spool header information or printer control commands of an input data, even when the input data is a spool file/job, printer-ready data, or device-dependent data. Accordingly, job settings, e.g., via printer job language (PJL) instructions, may be specified with data such as: (1) device-independent data that is native to the printer; (2) device-independent data that is not native to the printer; (3) printer-ready data with print control settings that is native to the printer; (4) printer-ready data with print control settings that is not native to the printer; and (5) spool encapsulated device-independent and printer-ready data, which may be native or non-native to the printer.

Moreover, the exemplary operating environment may include a target imaging device such as a printer or a multi-function peripheral, where the printer or printing module may include firmware or may otherwise be adapted to process for rendering input data in one or more formats termed "native" to the printer. For example, the printing module/printer may contain a raster image processor (RIP) or an interpreter embodied as hardware, software, or combination hardware/ software (i.e., firmware) module or device that directly converts input data in one format, e.g., images described in the form of vector graphics statements, into raster graphic images or bitmaps, typically without any further format conversion. To exemplify, an exemplary laser printer may include a RIP for converting images that arrive in vector form, e.g., scalable vector graphics (SVG) file, into a rasterized form without having to translate or convert the images in vector form to graphics device interface (GDI) objects, for example. In this example, the SVG file is native to that laser printer. In another example, a device-independent input data which is a file in portable document (PDF) format is natively supported by an imaging device if that imaging device contains a PDF interpreter typically adapted to directly receive the PDF file and process the PDF file, without converting the PDF file to another format, so as to rasterize the PDF file and generate output engine data. On the other hand, if the printer-ready input data is a postscript (PS) file and the imaging device supports PCL, i.e., adapted to receive and directly process and rasterize the PCL file, but not the PS format, the PCL format is deemed native to that imaging device, but the PS format is not—i.e., non-native.

Illustrated in FIG. 1 is a system 100 with a first client 110 and a second client 120, wherein the first client 110 has a direct print utility (DPU) 115 for directing the input data 114 according to a designated target imaging device 112 via, for example, a universal serial bus (USB) 116 and USB cable 118 to a printer 131, or via an Ethernet™ port 117 and a network link 119 to a network 160. The second client 120 may also have input data 124 being processed via a DPU 125 wherein the second client 120 may designate the input data 124 for printing to a designated target imaging device 122. The DPU 125 may direct the input data 124 via a network port 127 and a network link 128 to the network 160. The clients 110, 120 may be hosted on computing platforms such as a stationary or portable computer system or a hand-held or human-portable appliance. The clients 110, 120 may be in direct communication with the target imaging device via, for example, a serial bus 116, parallel port, or may be internetworked in a system having target imaging devices such as a multi-function peripheral device 134 or a printer 132, 133 where the printer 133 may have a printer server 140 interposed between the printer 133 and the client host 110, 120. Additionally, the connection may be wired or wireless, e.g., IrDA, Bluetooth, WiFi, etc. For example, a client DPU may transmit an input data 114, 124 for printing to the printer 133 via the print server 140. An example of a multi-function peripheral device (MFP) is a device adapted to perform printing functions, scanning functions, and copying functions. An MFP of the present invention may also be adapted to render input data, such as a PC-print, a PC-fax or a PC-file input job or other external job inputs such as remote copy, format conversation, and publishing to the web.

The exemplary system 100 may further include a converter server 150 that may additionally have available or have access to printer model databases indicating device models and native formats, and the converter server may further have available a direct print utility 152. A DPU may be operably connected to the various targeted imaging devices 131, 134, 132, 130, 140, 133 and to the converter server 150 via various communication schemes, including but not limited to, for example, Transmission Control Protocol/Internet Protocol (TCP/IP), AppleTalk™, IEEE 1284 Parallel Port, wireless protocols and schemes, e.g., infrared, BLUETOOTH™, WI-FI, serial bus, and Universal Serial Bus (USB). The exemplary communication scheme may also be employed when sending a spool job to any or all network segments 118, 119, 128, 161, 162, 163, 164, 166 and exemplary USB cable 118 may be replaced with wireless paths or other cabled or communication segments.

The exemplary operating environment 100 may also include networked, or locally or remotely connected printing; one or more multi-functional peripheral devices (MFPs) with outputting capabilities; one or more server computing devices; and one or more client computing devices. Each client and/or server may have a direct print utility (DPU) for directly submitting the document, image, vector or printer-ready data, when the format is supported natively by the target device. Each client and/or server may have conversion utilities or modules for converting non-native data to a native format.

Figure 2:
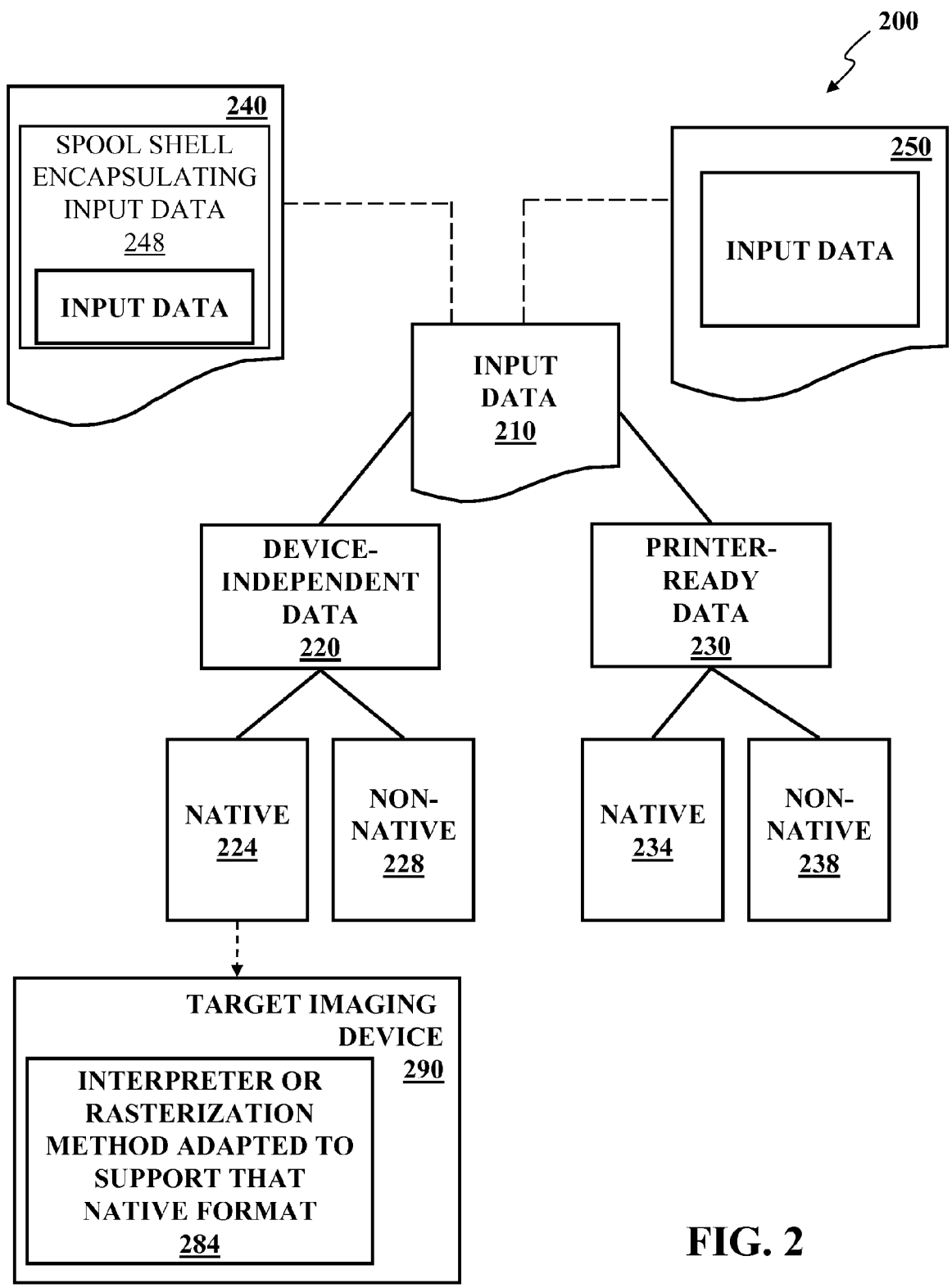
FIG. 2 is a high-level block diagram representing exemplary input data, for example, for printing, according to some embodiments of the present invention.

FIG. 2 is a high-level block diagram 200 representing exemplary input data 114, 124, for example, for printing such as a print data, according to some embodiments of the present invention. Input data may be embodied as files, including streaming files. In general, an input data 210, 114, 124 may be in encapsulated form 240—a spool data, or in unencapsulated form 250—a non-spool data. An input data 210 encapsulated or in spool form 240 is typically encapsulated within a spool skeleton or shell 248, e.g., a spool header and a spool footer. An unencapsulated input data 250 is typically not encapsulated in a spool shell.

In the embodiments of the present invention, an input data 210, whether such input data is in encapsulated 240 or unencapsulated form 250, may be further classified by its format type. An input data 210 may be a device-independent data 220 or a printer-ready data 230. Device-independent data 220 is data typically formatted, structured, and or stored, such that the data or file does not contain device-dependent or device-specific instructions or control commands. Furthermore, the device-independent data 220, which may be a document, image, or combinations thereof, is generally in a format enabling general viewing and editing. Examples of device-independent document data 220 may include documents, such as, portable document format (PDF) files defined by Adobe™, Microsoft™ WORD files, Microsoft™ POWERPOINT files, Microsoft™ EXCEL files, nroff files in the UNIX™ environment, and plain ASCII text files. Examples of device-independent image data, which may be vector or raster, may include Tagged Image File Format (TIFF) files, Joint Photographic Experts Group (JPEG) files, JPEG 2000 files, Portable Network Graphics (PNG) files, Graphics Interchange Format (GIF) files, Bitmap files—e.g., with .BMP or .DIB extensions, and Scalable Vector Graphics (SVG) files.

Another format type is the printer-ready data 230, which typically contains one or more instructions for a specific device, such as a printer. Such exemplary printer instructions may include instructions describing the layout of pages on a page-by-page basis, what to print on a page, what paper size, and other control commands that are typically specific for that particular device. Examples of printer-ready data 230 may include those structured as Printer Control Language (PCL) files, PCL 6 Enhanced—formerly known as PCL XL—files, PCL5 files, Postscript (PS) files, and EPSON™ EscP files.

The input data in encapsulated form 240 may be device-independent data 220 or printer-ready data 230 encapsulated within the spool shell, typically consisting of a spool header and a spool footer. The spool header, for example, may include job-wide settings, e.g., related to duplex mode, stapling option, input tray, and/or output bin, in a format compatible with the target device. The spool footer may indicate the end of the job. Examples of input data in encapsulated or spool form 240 include files structured or defined with Printer Job Language (PJL) commands or PJL files, and files in CIP4 Job Definition Format (JDF). PJL has been described, to be "above" PCL and other printer languages, and typically provide printer language switching between jobs, job separation, printer configuration, and status readback from the printer to the host computer. Other spool forms include Microsoft XPS print tickets for job, document and page elements, and print tickets for Microsoft WSD print.

Each of the input data format types 220, 230 may be further classified as native 224, 234 or non-native data 228, 238, based on the designated targeted imaging device 290, 131, 134, 130, 132, 140, 133—e.g., a device-independent input data may be native 224 or non-native 228 to a targeted imaging device (TID) 290. In some embodiments, an input data may be directed to more than one TID. An input data is native data if the TID directed to perform an imaging operation, such as printing of the input data, natively supports the format type of the input data. A TID 290, for example, natively supports an input data if the TID has the interpreter or rasterization method adapted to support that native format 284. For example, if the device-independent input data is a PDF file, that input data is natively 224 supported by the TID 290 if the TID has a local PDF interpreter available on the TID. On the other hand, a PDF input data is non-native data 228, if the TID does not have a local support for that format type, i.e., the TID does not have a local PDF interpreter, for example. If that TID has a local PS interpreter, that TID natively supports PS input data. Thus, an input data 114, 124 is native 224, 234 or non-native 228, 238 depending on the TID directed to perform operations on the input data.

One of ordinary skill in the art will appreciate that various input data or file formats typically have their own file structure and data storing means. For example, certain format types have unique signatures, such as character strings, that typically uniquely identify the format type. For example, a string "% PDF" in a header of an input data or a file typically indicates that the file is a PDF file. The file structures of most or all of the exemplary input data or files below are defined by various standard groups and/or specifications and are typically available. Table I below shows exemplary format types and their associated typically unique signatures, thereby enabling identification or classification of the particular file or input data.

TABLE I

Exemplary Signatures Associated with Certain File Types

| Input Data Format Type | File Type | Signature |
| --- | --- | --- |
| Device-Independent Data | PDF | % PDF |
| Spool or Encapsulated Form, Input data format type is based on encapsulated input data | PJL | @PJL |
| Printer-Ready Data | PS | %!PS |
| Printer-Ready Data | PCL | <ESC>E |
| Printer-Ready Data | PCL XL | ) HP-PCL XL; |
| Device-Independent Data | TIFF | II*<NUL> or MM<NUL>* |
| Device-Independent Data | JPEG | 0xFF 0xD8 0xFF 0xEE |
| Device-Independent Data | JPEG 2000 | 0xFF 0x4F |
| Device-Independent Data | PNG | 0x89PNG |

TABLE I-continued

Exemplary Signatures Associated with Certain File Types

| Input Data Format Type | File Type | Signature |
|---|---|---|
| Device-Independent Data | GIF | GIF87a OR GIF89a |
| Device-Independent Data | MS Windows Bitmap | BM |
| Device-Independent Data | SVG | <svg |

In other embodiments, the input data format type may be determined by either the presence or absence of sequences. In other embodiments, a file extension, for example, ".JPG" or "JPEG" may indicate a JPEG file, while a ".BMP" may indicate a MICROSOFT® WINDOWS bitmap file. In other embodiments, the recurring presence of certain character constructions or strings, e.g., "<svg . . . >" may indicate an SVG file, i.e., a device-independent data.

Figure 3:
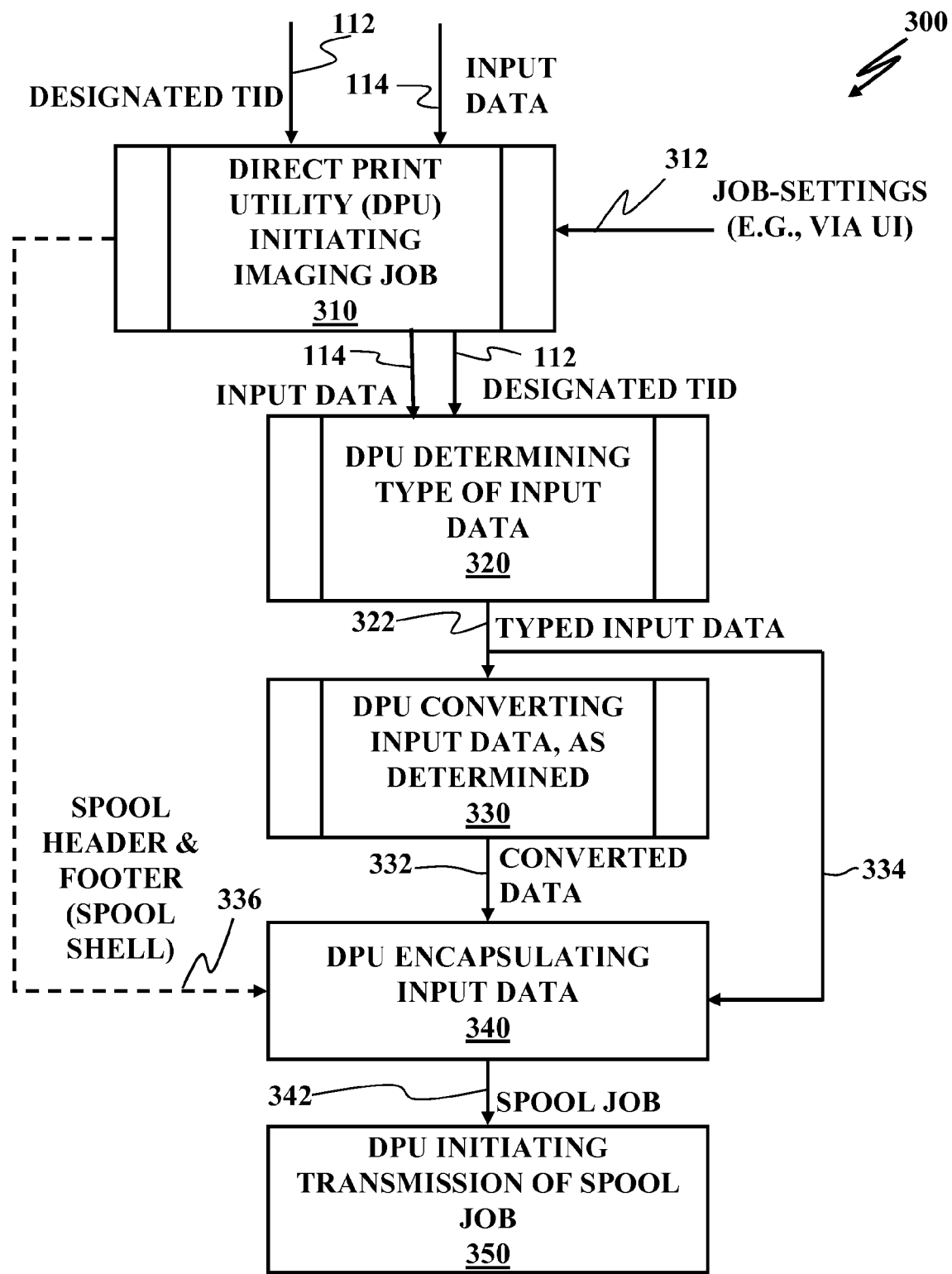
FIG. 3 is a flowchart illustrating an exemplary process embodiment of the present invention.

FIG. 3 illustrates a process 300 where a direct print utility (DPU) initiates 310 an imaging job of the input data 114 in accordance with the designated target input device 112, according to an embodiment of the invention. In some embodiments, job settings 312 are specified, for example, via a user interface (UI). A spool header and footer as a spool shell 336 for encapsulating the input data is generated, based on the specified job settings 312, for the designated target device 112. The format type of the input data 114 is then determined 320 including whether the input data is native or non-native in relation to the designated TID 112. If the typed or classified input data 322 is not of a format native, e.g., not supported in the firmware of the designated target device, such as an interpreter, the typed input data 322 is converted 330 into a converted native format 332 and encapsulated within a spool shell 336, by the spool encapsulating process 340 so as to generate a spool job or spool file 342. If the typed input data 322, however, is a device-independent native format supported by the TID 112, the input data 334 is encapsulated within the spool shell 336, by the spool encapsulating 340 to generate a spool job 342. The spool job or file is device-specific, i.e., specific to the targeted imaging device, incorporating the selected or defined job-settings 312 via the spool shell 336.

Once the spool job 342 is generated, the spool job 342 may thereafter be downloaded or transmitted 350 to the target imaging device 112 via protocols such as: (1) Line Printer Remote (LPR) protocol; (2) RAW 9100 protocol; (3) Internet Printing Protocol (IPP); (4) Novel Netware; (5) Web Service—Simple Object Access Protocol/Extensible Markup Language (SOAP/XML); (6) Hypertext Markup Language (HTML) via Hypertext Transfer Protocol (HTTP); (7) Network File System (NFS); (8) Remote Procedural Call (RPC); (9) File Transfer Protocol (FTP); (10) host-based spooler, e.g., Microsoft™ print spooler, and (10) Email messaging.

In some embodiments, the DPU may determine the print communication method or scheme supported by the target imaging device, e.g., using preconfigured information, by directly querying the target device and/or the printer server coupled to such target device, or by receiving information from the target device and/or the printer server based on some broadcast or messaging scheme. Prior to despooling to the target device, the DPU may also perform some post-processing on the spool job, for example, compressing and/or encrypting the spool job. In some embodiments, a filtering process 330, 610 may be performed on the input data, particularly, when the input data has a printer-ready format, prior to the input data being encapsulated in a spool shell.

In some embodiments, when the spool job is transmitted or despooled to the target device 350, the target device or the print server may send one or more notifications indicating the progress of the imaging job, e.g., printing interrupted, resumed, completed, errored, canceled, percentage (%) completed, and page and/or copy outputted.

Generally, the DPU of the several embodiments of the present invention processes input data, e.g., device-independent data and printer-ready data, according to whether that input data is determined to be native to the processing of the target imaging device. If the format of the input data is determined to be native, the input data need not be further processed for purposes of format conversion. The input data may be embedded or encapsulated within the spool job skeleton or shell at the appropriate location(s), for example, in a PJL file. Preferably, the input data encapsulated in the spool shell, i.e., the spool job 342, is in a format native to the printer, i.e., the input data does not require additional processing into a format that may be rendered by the target imaging device. For example, if the input data is non-native to the target device, the input data typically requires additional processing before the input data may be rendered by the target device.

One of ordinary skill in the art will appreciate that the various processes, including sub-processes, described herein may be modified, such as combined and/or further subdivided, and yet still be in the spirit of the present invention. Furthermore, the processes described herein may be embodied as a set of program instructions, e.g., software, hardware, or firmware.

Figure 4:
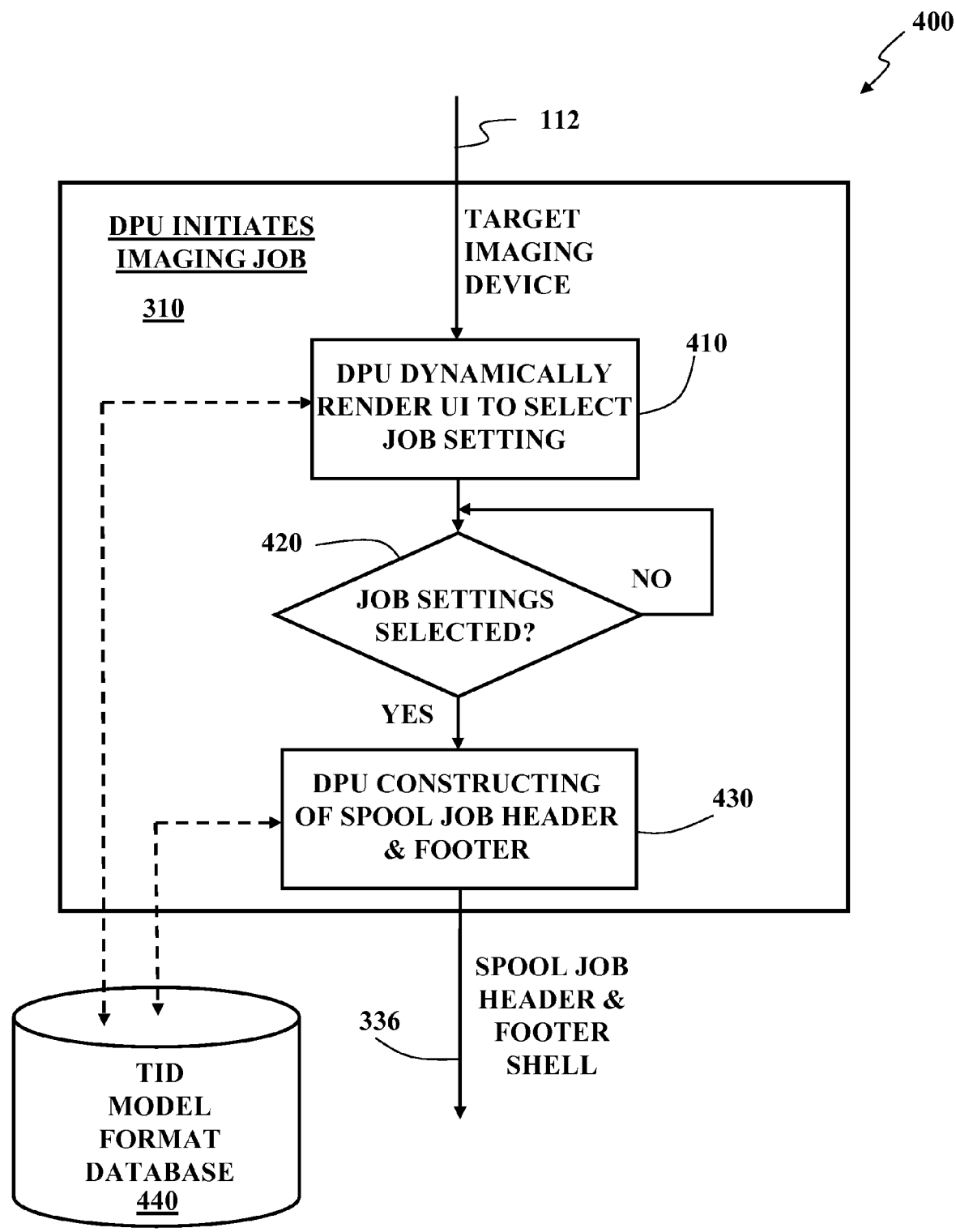
FIG. 4 is a flowchart illustrating an exemplary sub-process of an exemplary direct print utility (DPU) initiating an imaging job, according to an embodiment of the present invention.

FIG. 4 illustrates an exemplary sub-process 400 of the DPU initiating an imaging job 310, e.g., print, remote copy, fax, file, publish, including web publish, indexing, natural language translation, or conversion, of the input data directed to the targeted imaging device, e.g., a printer. Once a target imaging device is designated 112, the DPU may dynamically render, for example, a user interface (UI) adapted to receive job-setting selections 410. Job settings specific for an input data and native to a targeted imaging device may be provided in many ways, for example, via manual entries through the presented UI, via manual entries using a command line interface, via selection of format or default settings, and via selection of dynamically enumerated job settings provided, for example, by a print server. The job settings specified via the DPU are typically dynamically configurable to the selected targeted device. An example is through the use of a printer or device model format database 440, which describes the device's capabilities, options/settings, and associated control strings or control sequences. In some embodiments, the information for a device model format database 440 may come directly from the device itself—e.g., WDP printer profile or XPS Print Configuration Document.

In some embodiments, the selection of the designated target imaging device may also be provided to a user, for example. Available target imaging devices may be provided via a manual input through an administrative interface—e.g., a key operator code on a front panel interface or an embedded web page, and/or provided by a print server, or by an automatic registration or discovery of such devices by the DPU, e.g., via broadcast discovery, Simple Network Management Protocol (SNMP), Service Location Protocol (SLP), Simple Service Discovery Protocol (SSDP), Salutation™—service discovery and service management architecture, Web Services Dynamic Discovery (WS-Discovery), Microsoft™ Universal Plug and Play (UPnP), Sun™ Jini, and Bluetooth.

The DPU, for example, may query the target imaging device format database 440 to ascertain formats supported in the rendering process of the designated target imaging device.

The database 440 may also be queried to obtain the information to render with the UI to enable job-setting selections specific to the target device. The database 440 may then be further queried to map or translate the user selections into device-specific control sequences. For example, such a database is described in U.S. patent application Ser. No. 10/397,814, filed Mar. 25, 2003, entitled "User Definable Print-Option Conversion for Heterogeneous Cluster Printing," published as U.S. patent application Publication No. 2004/0190032 A1, Sep. 30, 2004. The exemplary target imaging device format database 440 may be hosted along with the client or may be associated with a server within a network of which a client DPU is a part. In other embodiments, the targeted device maintains its own device format database 440, which may be directly queried by a DPU. In some embodiments, the decision on whether to convert the file format or not may be deferred until after the job settings are selected, but typically the imaging device selection 112 occurs before the spool shell is constructed.

In those embodiments, the UI may be rendered either based on some presumed common set of capabilities and options/settings, or based on a device class, e.g., a virtual device.

Once the one or more devices are selected, the selected options/settings may then be converted or translated into the device-specific control sequences, via a spool shell.

Once the job settings are selected or designated 420, the DPU constructs a spool shell or skeleton 430, 336 consisting, for example, of a spool job header and a footer, which contains the selected or designated job settings in a format native to, and readily supported and addressed by the target imaging device. The spool shell, i.e., absent the input data to be rendered, typically includes a set of instructions for a complete print job compatible with the one or more targeted imaging devices.

Typically, a spool shell 336 contains the following components: (1) a command control sequence indicating the start of a job, for example, the universal exit language (UEL) command; (2) a command control sequence specifying the job-wide requirements, which may use, for example, PJL commands; (3) a placeholder, or region, to indicate the format of the input data to be rendered; (4) a placeholder, or region, for the input data to be rendered; and (5) a command control sequence indicating the end of a job, for example, using UEL. After creation of the spool shell, the DPU may then determine the kind of preprocessing, if any, to which the input data is first subjected typically before being encapsulated within this generated spool skeleton. The kind of processing may depend on the format of the input data and whether the input data is native to the target device.

Figure 5:
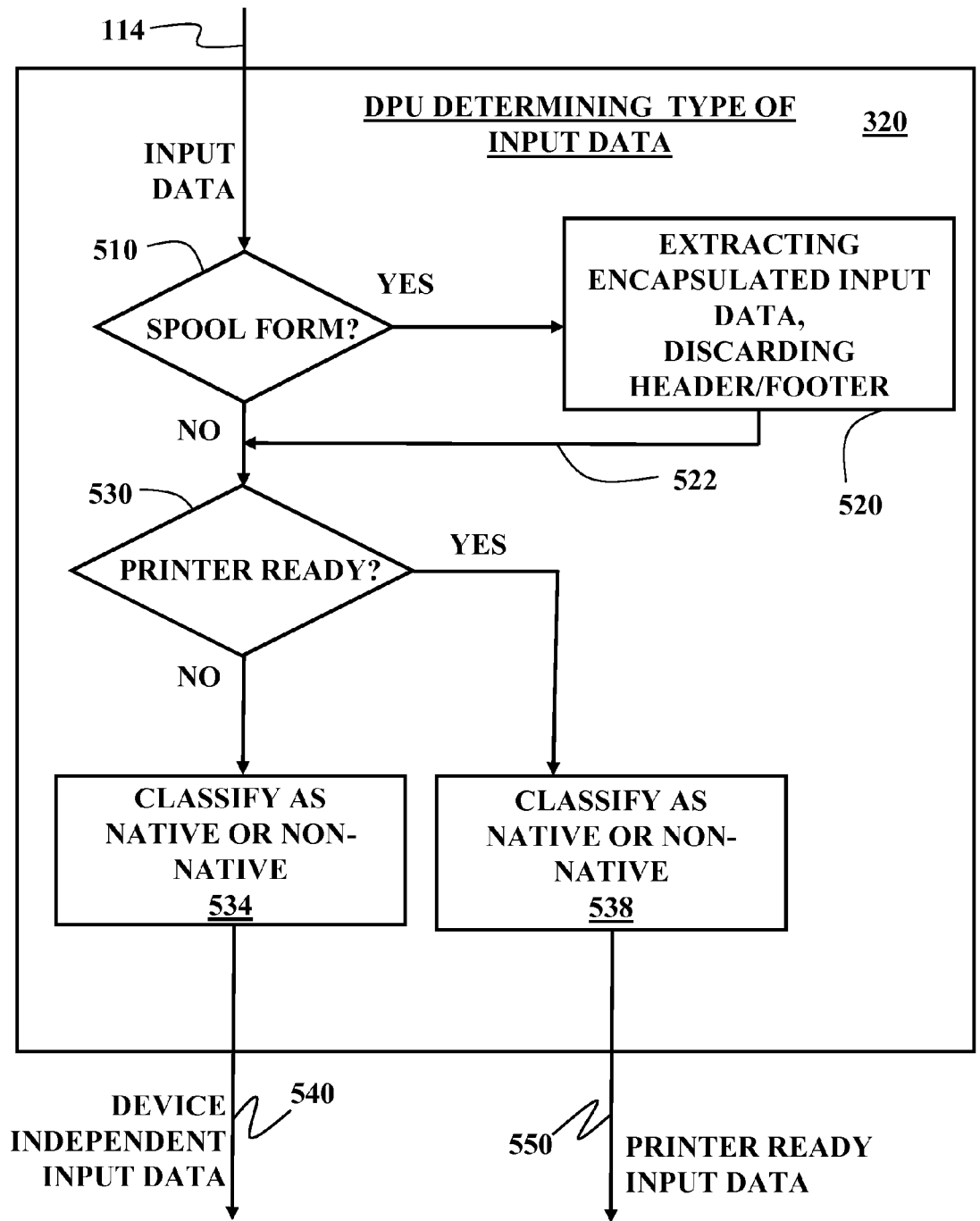
FIG. 5 is a flowchart illustrating an exemplary sub-process of an exemplary DPU determining the format of an exemplary input data, according to an embodiment of the present invention.

FIG. 5 illustrates an exemplary sub-process of the DPU determining the type of input data 320, according to an embodiment of the invention. As mentioned above, the DPU may receive encapsulated input data 240 or unencapsulated input data 250. A check is typically first performed to determine if the input data is in spool or encapsulated form 510. Such input data typically contains old spool header and footer that may potentially be in conflict with the designated target device or with the generated or new spool shell 336 based on the job settings selected 312. If the input data is in encapsulated form, (510, "yes" branch), the encapsulated input data is extracted and the spooler header and footer from which the input data is extracted may be discarded or removed 520. The determination whether the input data is encapsulated in spool form may be determined, for example, by detecting for the presence of a spool header or footer, or both. In some embodiments, the DPU may extract the input data by parsing the spool file until a determination is made as to the starting location of the encapsulated input data, e.g., in PJL this is the data following the "@PJL ENTER LANGUAGE=cformat>" sequence. The extracted input data 522 may then be subject to a determining sub-process similar to the unencapsulated, i.e., non-spool, data where the DPU may determine whether the input data is a device-independent format type 540 (530, "no" branch), or a printer-ready format type 550 (530, "yes" branch).

If the input data is unencapsulated 250 (510, "no" branch), similar to the extracted input data above, the DPU then classifies the input data, typically without extraction, either as printer-ready input data or device-independent data. The DPU may determine the classification or format type of the input data in many ways, for example: (1) manual entry by the user; (2) derived from the data name, e.g., a file name, such as from the file suffix or file extension; and (3) parsing the data to identify a sequence, for example, that uniquely identifies the data format. (See Table I and discussion above.)

Once classified to whether device-independent 220 or printer-ready 230, the input data is typically further analyzed to determine whether the classified input data is native or non-native to the targeted device 112 (534, 538). For example, if the input data is a device-independent data type, e.g., a JPG file, the input data is further analyzed to determine whether the input data is native 534 to the target imaging device 112. This native or non-native analysis or classification 534, 538 may include accessing the exemplary printer model database 440 to determine or ascertain whether the target device supports the determined input data format type, in this example, device-independent JPG format. If the target device supports JPG, e.g., via a JPG format interpreter, the exemplary designated target device 112 thus is typically adapted to rasterize the JPG input data without additional format conversion—thus, the JPG format is deemed native to the target device. If the target device, however, does not support JPG, e.g., without a JPG interpreter, the JPG format is deemed non-native to this target device. In some embodiments, the target imaging device may be directly queried by the DPU to determine whether the target device supports a particular format type or has the appropriate format interpreter. In some embodiments, the target device may indirectly support a format as native, without an interpreter within the device, through the use of an external format conversion service (e.g., a web service) that the target device is communicatively coupled to or connected with.

In the case where the input data is in encapsulated/spool form, i.e., a spool job, the determination of whether the format is native is based on the format of the encapsulated input data. The DPU may then determine the preprocessing of that extracted or encapsulated input data, if any, depending on the input data format type and whether it is native or non-native to the target device.

Figure 6:
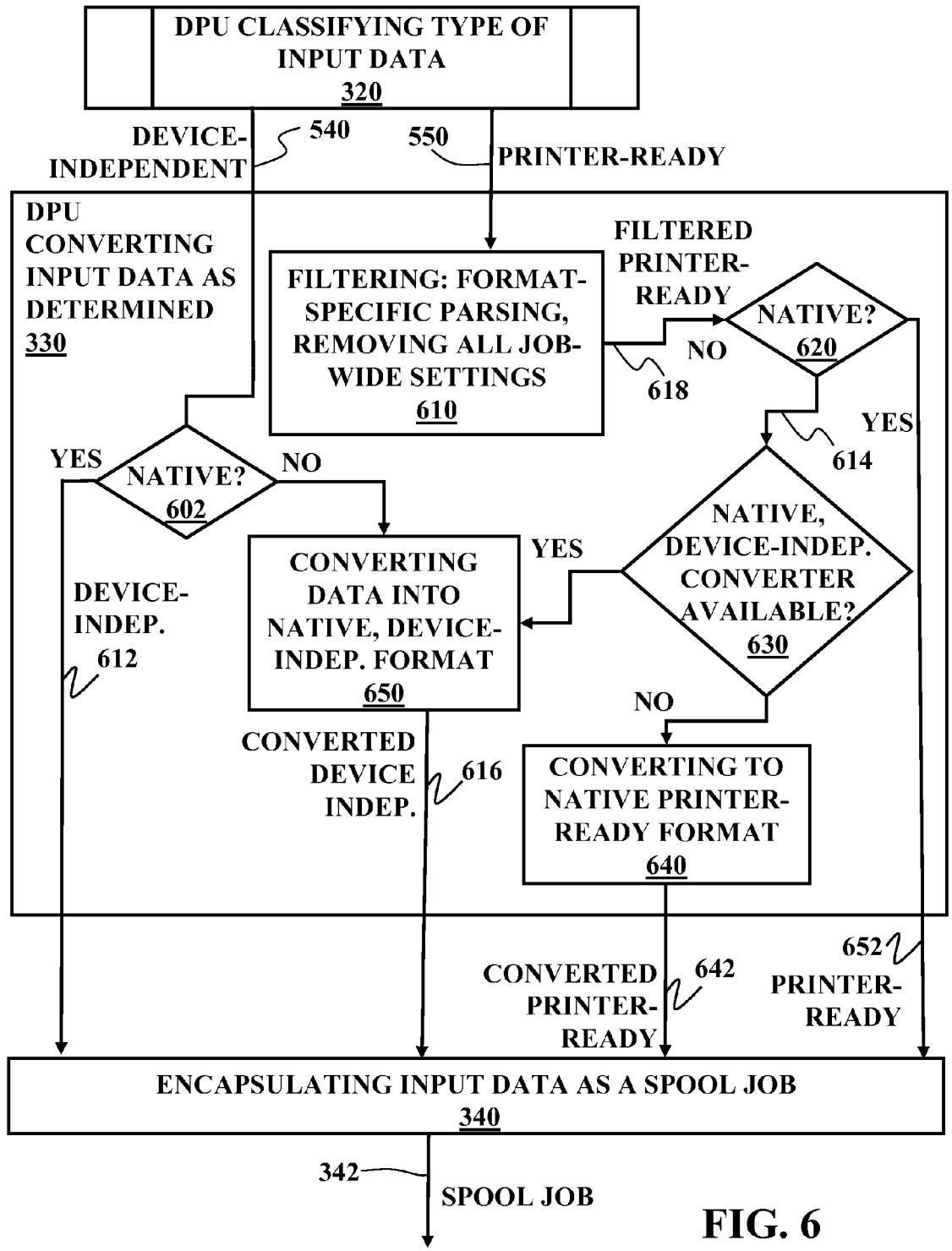
FIG. 6 is a flowchart illustrating an exemplary sub-process of an exemplary DPU converting an exemplary input data, according to an embodiment of the present invention.

FIG. 6 illustrates an exemplary sub-process of the DPU converting the input data 330 as determined in the preceding DPU classifying sub-process 320. The DPU process, in general, determines if the input data format type is supported for rendering by, native to, the targeted device (see FIG. 5). If the input data format is not native to the targeted device, the non-native data typically undergoes additional processing, e.g., conversion from a non-native format to a native format. The native or non-native determination may be based on information contained in a printer model database 440 as described above, for example.

Even though the printer ready data is identified as not being supported for rendering by the target image device, i.e., the printer is in a non-native format, the printer ready data in the non-native format may be filtered to remove the job wide settings as described for the printer ready data in a native format.

In several embodiments of the present invention, the DPU processes device-independent document/image/vector data 540 according to whether the format is native or non-native to the target device. When the device-independent input data is native to or supported by the target device (602, "yes" branch), the input data 612 is typically not processed further and is encapsulated or embedded 340 within the spool shell 336, based on the job-settings selected 312, to generate a spool job 342 specific and native to the target device 112.

Table II below shows a portion of an exemplary spool skeleton/shell wherein an input data—e.g., document, image, or raster—may be embedded or encapsulated at the appropriate location, as specified by the exemplary "<place data to render here>" placeholder.

TABLE II

EXEMPLARY SPOOL SHELL

UEL
@PJL RESET
@PJL JOB NAME="..."
@PJL job setting 1
...
@PJL job setting N
@PJL ENTER LANGUAGE=<format>
< place data to render here>
UEL
@PJL EOJ NAME="..."
UEL When the device-independent data is non-native (602, "no" branch), the non-native format is first converted to a native device-independent format 650 supported by and native to the target device, and which may be based on performance, e.g., requiring the least conversion processing time or least cost, e.g., billable process, prior to encapsulation within a spool shell to generate a spool job. If a conversion method is not available, then the print or imaging process may be terminated (not shown) or in some embodiments, a conversion server may be addressed by the client DPU (not shown) to perform a non-native to native format conversion. Otherwise, the non-native to native conversion 650 may proceed as follows: (1) if the input data is a raster image, a direct image-to-image format conversion utility may be applied, such as for example the LEADTOOLS Raster Imaging Toolkits available form Lead Technologies™, e.g., convert a TIFF file to a JPG2000 file; (2) if the input is a vector format file, a direct vector-to-image format conversion may be performed, where the vector data is interpreted by a vector-format specific interpreter into an image format, e.g., convert SVG file to a TIFF file; or (3) if the input data is a document format, e.g., a Microsoft™WORD document, the document data is first converted through the use of a document-format specific application, e.g., Microsoft™WORD, which converts the document data into the operating system's device independent graphical primitives, e.g., graphics device interface (GDI) objects, where the graphical primitives are then converted into an image format by an image outputting driver, e.g., the Informatik, Inc, TIFF printer driver.

After the non-native to native format conversion is performed 650, the converted native device-independent data 614 may then be embedded within the spool shell 336 at an appropriate location, such as that specified by the exemplary "<place data to render here>" placeholder described and listed in Table II above.

If the DPU determines that the input data is not in a device-independent format, the DPU may determine whether the input data is printer-ready data 550, e.g., PCL, PCL XL, or Postscript. A printer-ready input data 550 is typically filtered (step 610). The filtering process may include recognition and removal of command control sequences, which may be job-wide settings, specified by a previous spool header and/or footer, and/or may be a potential conflict with the current or selected job settings 312. Examples of job wide settings may include duplex mode, input tray selection, output bin selection, the number of copies, collation option, paper size, and page orientation. Accordingly, the filtering process is adapted to remove some or all of the command control sequences that are job wide settings; some or all of the command control sequences that are specified by the spool job; or some or all of the command control sequences that are in conflict with the job settings in the spool job; or any combination thereof.

Generally, the above filtering of the printer-ready data may be accomplished by parsing the input data using a format-specific parser that recognizes and characterizes the command sequences or such settings and accordingly removes or deletes them. Printer-ready formats, such as PCL, Postscript, and EscP, are well known and their specifications available. The format-specific parser thus may parse the file, for example, and search for search strings that match commands indicating job-wide settings.

In other embodiments, the input printer-ready data may contain command sequences particular to a manufacturer. Manufacturer-specific command sequences may be categorized as manufacturer-specific operand values or manufacturer-specific commands. An example of a manufacturer-specific operand value may be in a situation where a manufacturer assigns manufacturer-specific operand values to a printer input tray command that represents the manufacturer's input trays. Considering that the command itself may be in a fixed or defined format, manufacturer-specific operands may be ignored, because the entire command sequence may be removed as a part of the filtering. An example of a manufacturer-specific command may be in a situation where a manufacturer may assign a manufacturer-specific command sequence to control a manufacturer-specific finishing device. Considering that the command is specific to a particular manufacturer's device and the setting for the target imaging device is controlled by the spool header 312, 336, the filtering process may remove the entire manufacturer-specific command, without substantially affecting the printing or imaging process, even though the meaning of that command is not recognized.

After the printer-ready data is filtered, a check may then be made to determine if the filtered printer-ready data 618 is native to and supported by the targeted imaging device 620. If the filtered printer-ready input data is native data (620, "yes" branch), that filtered native printer-ready data 652 supported by the targeted imaging device may then be processed for encapsulation as a spool job 340, e.g., by embedding the printer-ready data within the spool shell 336 at an appropriate location, such as that exemplified by the "<place data to render here>" placeholder described and listed in Table II above.

On the other hand, if the filtered printer-ready data is non-native, i.e., not supported by the target device (620, "no" branch), the filtered non-native printer-ready data 614 may then be converted into either a native device-independent or native printer-ready format. The conversion choice may be based on performance, e.g., requiring the least conversion processing time or least cost, e.g., billable process. If a conversion method is not accessible or is not found, then the print or imaging process is terminated (not shown). Such a conversion method, for example, may be performed by a client DPU or a server DPU. If a converting module or firmware or software-based processing module adapted to convert the non-native printer-ready format to a native device-independent format is available (630, "yes" branch), the conversion, e.g., from Postscript to TIFF, may be processed via a direct format-to-format conversion utility, such as may be provided by Ghostscript, for example. Continuing in this example, if a device-independent converter is available for invocation by the DPU to convert the filtered printer ready non-native input data into a device-independent format native to the target imaging device, then the conversion may be invoked 650 and the converted native device-independent data 616 may be made available for encapsulating 340 as a spool job 342. Absent the availability of the device-independent converting module, the DPU may convert the filtered non-native printer-ready data 614 to a printer-ready format 640 native to the target imaging device and the converted printer-ready data 642 may be processed for encapsulating 340 as a spool job 342. Typically, the conversion (step 640) may be effected by the client DPU via, for example, a direct format-to-format conversion utility, e.g., PCL to Postscript, provided by Ghostscript. In other embodiments, the conversion may be performed by a server DPU.

One of ordinary skill in the art will appreciate that the steps of filtering 610 and checking for native or non-native format 620 may be modified, for example, processed in a reverse order. For example, the check whether the printer-ready data is native or non-native 620 may be performed prior to the filtering process 610. Furthermore, other variations, such as the conversion of the non-native printer-ready format to a native print-ready format 640 may be prioritized such that the conversion to a native device-independent format is only performed if no non-native to native printer-ready format conversion is available. In other embodiments, the conversion process selected may be based on other conditions, such as one, which results in the least amount of processing time, the format type, and/or the capabilities and format support of the target device. In other formats, the input data to be rendered may be in a composite or mixed format (i.e., more than one format). In this case, the process may be performed on each region of the data of a different format. The process may be performed serially or in parallel.

The format conversion process (e.g., 650, 640) may be performed at any node in the network preferably a node having one or more format converters available. The conversion process may be performed locally, at another device, or provided directly as an external translation service to the imaging device, such as in the methods described herein. For example, the format conversion may be done by a processing module local to the client where the DPU is initiated or by a remote computing device, e.g., a conversion server 150. A conversion service may be known by the client DPU application by any means, such as: (1) a manual input through an administrative interface, e.g., a key operator code on a front panel interface or an embedded web page; (2) an automatic registration by the conversion device through a programmatic registration interface on the device, e.g., via Simple Object Access Protocol (SOAP), Hypertext Transfer Protocol (HTTP), or proprietary protocols over TCP/IP; and (3) discovery of the conversion device by the DPU server by a service discovery protocol, e.g., via Service Location Protocol (SLP), Simple Service Discovery Protocol (SSDP), Salutation™—service discovery and service management architecture, Web Services Dynamic Discovery (WS-Discovery), Microsoft™ Universal Plug and Play (UPnP), Sun™ Jini, and Bluetooth.

In some embodiments, the client DPU forwards the non-native data to the conversion device, which returns the data to the client DPU in a native format, after performing a format conversion, and the client DPU may then proceed with spool job encapsulation. In some embodiments, the conversion device is known by the target imaging device and the client DPU embeds the non-native data or reference to it in the spool job and forwards the spool job to the target imaging device where the imaging device then extracts the non-native data, or links to its reference, and forwards the non-native data to the conversion device, which then returns, or downloads, the data in a native format to the target imaging device.

Figure 7:
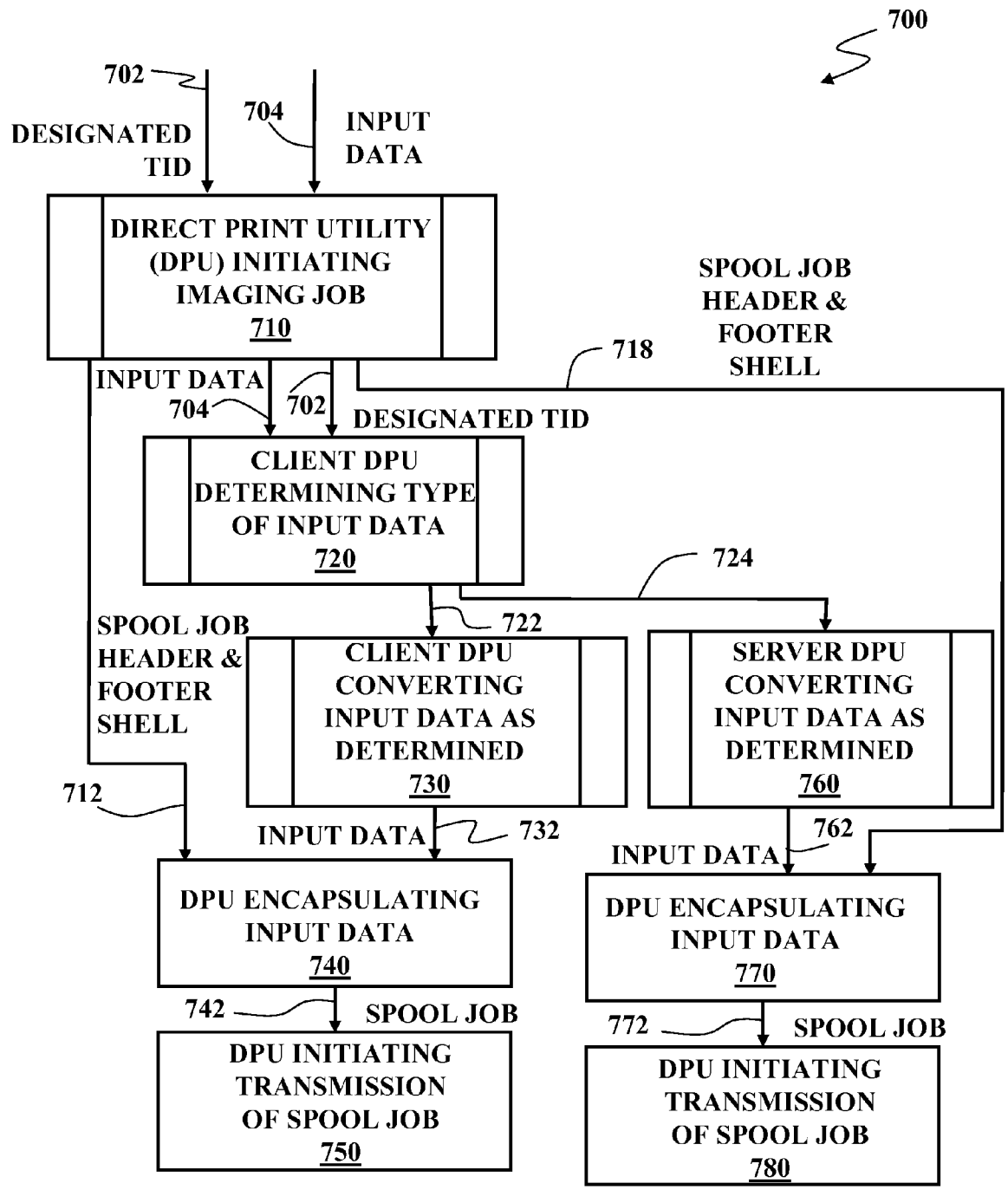
FIG. 7 is a flowchart illustrating an exemplary process where a system including a client DPU and a server DPU may convert input data, according to an embodiment of the present invention.

FIG. 7 illustrates an exemplary process 700 where a system including a client DPU and a server DPU may convert input data as determined by the client DPU. In this example, the DPU imaging job is initiated 710 when the target imaging device is designated 702 for an input data 704. A spool job header and footer shell 712 may be generated 710 and provided to the client DPU for the step of encapsulating the input data 740. A spool job header and footer shell 718 may be generated 710 and provided to the server DPU for the step of encapsulating the input data 770. The client DPU may determine 720 the format type of the input data 704, particularly whether printer-ready or device-independent. The client DPU may then determine, based on the determined format type of the input data and the designated target imaging device 702, that the encapsulating step of the input data 722 as a spool job may be executed at the client DPU with available format converters or that the encapsulation of the input data 724 as a spool job may be done at a server DPU with available format converters. For example, depending on the outcome of the type determining and conversion availability assessment of the sub-process 720, the client DPU may convert 730 the typed input data 722 designated for conversion by the client DPU or the server DPU may convert 760 the typed input data 724 designated for conversion by the server DPU. In this example, the client DPU may encapsulate 740 the input data 732 converted by the client DPU converting sub-process 730 within the spool job header and footer shell 712 to produce a spool job 742 that may be transmitted upon the initiation of the transmission process 750 of the client DPU. Also in this example, the server DPU may encapsulate 770 the input data 762 converted by the server DPU converting sub-process 760 within the spool job header and footer shell 718 to produce a spool job 772 that may be transmitted upon the initiation of the transmission process 780 of the server DPU. In some embodiments not shown, a converted data converted by the server DPU may be transmitted to the client DPU to enable the client DPU to encapsulate 740 converted data into a spool job. Similarly, a converted data converted by the client DPU may be transmitted to the server DPU to enable the server DPU to encapsulate such converted data 770. One of ordinary skill in the art will appreciate that the processes described herein may be divided over one, two, or more DPUs, such as one may perform the process of determining the format type of the input data, another one performing the conversion process, and another performing the encapsulation and generation of the spool job, and even another for transmitting the spool job. The various DPUs may be resident in various devices.

The exemplary system 100 described herein is further adapted to share the processing over various nodes of the system, e.g., at a client, at a converter server, and/or at a printer server, for example. In some embodiments, a manner of distributing or allocating the processes over the various nodes whereby the distribution of processes may potentially provide efficiency is provided herein, based, for example, on the input data format and/or file complexity.

Figure 8:
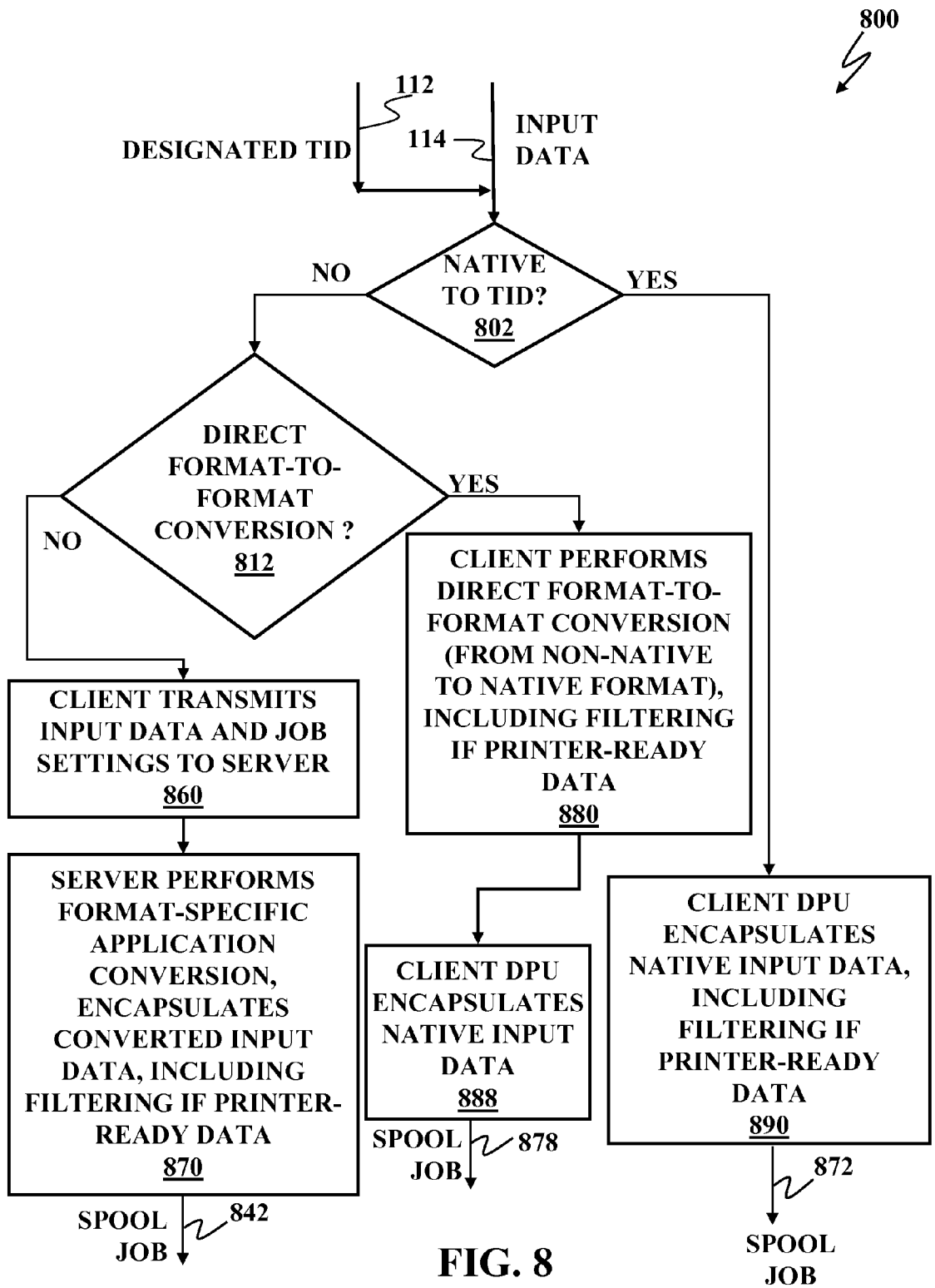
FIG. 8 illustrates an exemplary process determining where the various DPU processes may be performed or allocated, according to an embodiment of the present invention.

FIG. 8 illustrates an exemplary process 800 determining where the processes of the present invention, particularly the various DPU processes may be performed or allocated, e.g., at a client DPU or at a server DPU. A server DPU may be a converter server 152 and/or a printer server 140. In general, there are two types of conversion processes, a direct format-to-format conversion process and a format-specific application conversion process. In some embodiments of the invention, the type of conversion to be performed may influence where that conversion is to be performed for non-native input data.

A direct format-to-format conversion process typically involves having an application program or a set of program instructions, in software, hardware, or firmware, read an input data and translating or converting that input data into another file format, e.g., directly converting a JPG file to a TIFF file—typically, without having to execute or load a format-specific application program and conversion driver (e.g., printer driver) to perform the conversion. Examples of direct format-to-format conversion methods include: (1) image format or encoding conversion to another image format or encoding—e.g., compression; (2) image-to-PDF conversion, e.g., TIFF to PDF; and (3) Postscript/PCL-to-image format—e.g., using Ghostscript and/or GhostPCL.

The format-specific application conversion process, on the other hand, utilizes a format-specific application and a conversion driver to convert the input data into another format. The format-specific application may be the application program that typically generates such input data, for example, Microsoft™ WORD and Microsoft™ POWERPOINT are format-specific applications that typically create files with a ".DOC" and a ".PPT" extension, respectively. In some embodiments, at least for the Microsoft™ WINDOWS operating system environment, the format-specific application supporting that input data typically reads the input data, and converts that input data into GDI objects, which are then passed to a printer driver or conversion driver specific to the target imaging device. The conversion driver then accordingly converts the GDI objects into a printer-specific format, such as printer-ready data or appropriate device-independent data natively supported by the target device.

Using the input data 114, a check is made to determine if the input data is native to the target device 802. If the input data is native to the target device, the client DPU may encapsulate the input data within the spool header/footer 340 and send the encapsulated input data as a spool job 342 directly to the target device 890. In some embodiments, printer-ready data may be filtered 610, 890 prior to encapsulating as a spool job 872. On the other hand, if the non-native input data may be converted with a direct format-to-format conversion process, and assuming that this type of conversion process is available at the client DPU, the conversion is typically then performed at the client DPU 330, with a filtering process applied to printer-ready data 880, and the encapsulation process to generate a spool job 878 also performed by the client 888. Otherwise, the input data may require format-specific application conversion (812, "no" branch). Assuming that the server DPU has the format-specific application conversion module, this conversion process is performed at a server DPU. In this embodiment, the client DPU transmits 860 the input data, which may include the classification of the input data, and the job settings selected or designated 312, 336. In some embodiments, the job settings are transmitted as a spool shell, thereby alleviating the server DPU to generate a spool shell 336. In other embodiments, job setting information is sent, and the spool shell is generated by the server DPU. The server DPU may then convert 330 the input data into a native format compatible with the target device using a format-specific application and a conversion driver and the converted data may then be encapsulated within the spooler shell based on the job settings 870 to generate a spool job 842. The spool job 842, 878, 872 is accordingly transmitted to the printer, which may be via a printer server, to be rendered.

In some embodiments, the DPU may also enhance the performance by considering whether the target imaging device has a direct image print capability, i.e., whether the device requires only a partial RIP on the printer to rasterize. Generally, a partial RIP is where the host side and firmware side share the rasterization process. Where the host performs some initial portion (e.g., first half) and the printer completes the process (e.g., last half). One well-known method of partial RIP is where the host converts document data into a bitmap in RGB space, and the firmware then processes the RGB bitmap into a CMYK halftoned raster image. If so, when converting, the allocation of the conversion process, for example, may give preference to conversion methods, which generate a device-independent image format, e.g., TIFF, JPG, or BMP, compatible or native with the target device. A DPU may communicate with the target device or printer server—e.g., transmit the spool job, for example, via the exemplified communication schemes described herein. In other embodiments, the conversion allocation process may also consider the cost of the conversion, when there is a billable charge, and make a decision about the tradeoff of cost versus performance.

Figure 9:
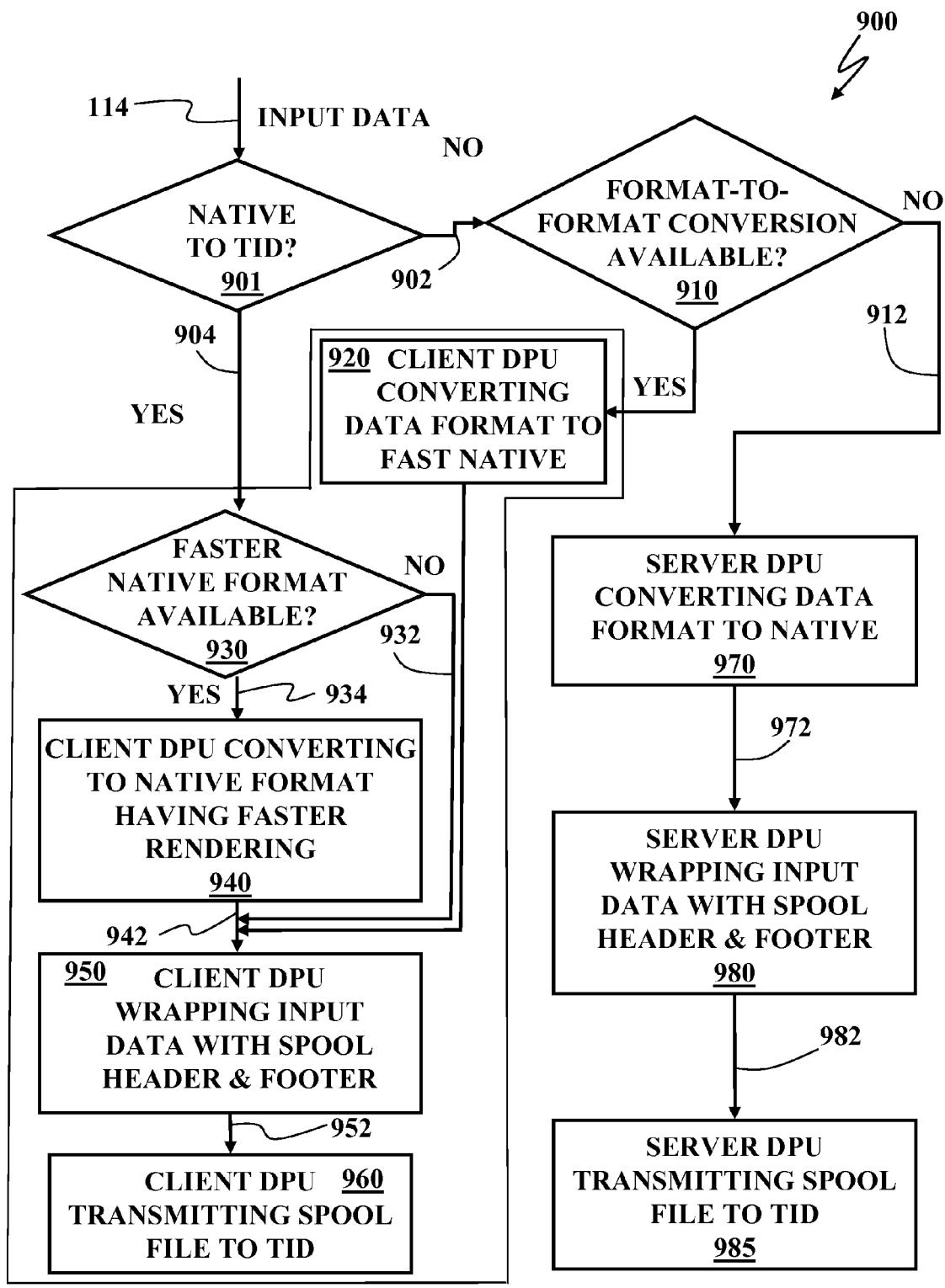
FIG. 9 illustrates exemplary sub-processes illustrating other embodiments of processing allocation and conversion variation, according to some embodiments of the invention.

FIG. 9 illustrates exemplary sub-processes 900 illustrating other embodiments of processing allocation and conversion variation, according to some embodiments of the invention. The determining step 901 may relate the model of the designated target image device with a database of natively supported formats, and conversion methods available and executable by the target imaging device. If the client DPU determines 901 the form of the input data is supported as a format native to the target imaging device 904, the client DPU, and in some embodiments the server DPU, may search for a second or another native format that may be rendered faster, i.e., require fewer processing steps, by the target imaging device than the present or first native format and determine whether the faster native format is available 930. Typically, the nearer or closer the format is to a final raster format, the faster the printer is able to complete the rasterization process. As a general rule of thumb, document formats—e.g., Microsoft™ WORD documents—are the farthest away from raster image, printer-ready data—e.g., PCL or Postscript files—the next closest, and image data—e.g., JPG or TIFF files—the closest. In other words, generally, in order of slowest to fastest format, a device-independent document is the slowest format, followed by printer-ready data, then device-independent image data as the fastest format to be rendered. In some embodiments, the format database 440 may have information on the printer's performance for each format type.

If the format converter to the faster rendering format is available, the input data 934 may be converted, optionally filtered if printer-ready data, to the faster rendering format 940. The client DPU may thereafter encapsulate the input data converted to the faster native format 942 and generate a spool job 952, by the encapsulating process 950. If the faster rendering format converter is not available, then the input data 932 in its present native format, optionally with filtering if printer-ready data, may thereafter be encapsulated 950 as a spool job 952. The client DPU, and in some embodiments the server DPU, may then transmit 960 the spool file 952 to the target imaging device. In some embodiments, the testing for a faster format 930, converting to a faster format 940, encapsulating 950, and transmitting 960 the spool file to the target imaging device may all be executed by a client DPU, by a server DPU, or be executed and allocated between a client DPU and a server DPU. The server DPU may be a conversion server DPU or a printer server DPU.

To exemplify, if the native input data format 904 is a device-independent PDF format, the client DPU may choose to covert that PDF input data into an image format, e.g., TIFF or JPG, assuming that the target device renders TIFF or JPG data faster than PDF data. In other embodiments not shown, the client DPU may transmit the input data, including settings and/or spool shell, to the server DPU, e.g., print server DPU, for conversion to the faster rendering format. The conversion may be relegated to the server DPU, if such format conversion is not available at the client DPU or based on other defined conditions.

On the other hand, if the input data is not native to the target device 902, the client DPU, in some embodiments, a server DPU, may determine if there are format-to-format conversions available 910. From these available format conversion utilities or modules, the DPU selects the native format, which is typically most efficient for both the client DPU and the target device. For example, if the target device supports an image data format, i.e., may be rasterized with a partial RIP by the target device, the DPU may give preference to the conversion method producing such a more efficient or faster format. The client DPU, and in some embodiments, the server DPU, may convert 920 the data to a format native to the target imaging device, typically providing better efficiency, and thereafter may encapsulate 950 the converted native input data as a spool job 952. Filtering may optionally be performed.

In other embodiments, a direct format-to-format conversion method may only be available at a server DPU and/or a faster format conversion method may only be available at the server DPU. In these embodiments, the client DPU may forward the input data and job settings, which may be in a spool shell form, to the server DPU, e.g., print server DPU. The server DPU may then perform the conversion 940, including appropriate filtering, of the input data, and encapsulation 950, generation 950, and transmission 960 of the spool file, similar to those described above.

If the input data is determined to be not native and no direct format-to-format conversion is available 912 at a client DPU and/or the server DPU, a format-specific application conversion may be performed at a server DPU. In this exemplary embodiment, the client DPU may then determine if there is a format-specific application conversion module, such as a conversion driver, available on the server DPU. For example, a server DPU may have access to a variety of application viewers—e.g., viewers adapted to present data, but not editing—for a variety of formats, which may be adapted to convert the non-native input data into the operating system's device-independent graphical instructions, e.g., GDI objects. These graphical instructions are then converted to an image format or another format using a conversion driver, such as for example, a TIFF driver, a SVG driver, etc.

Assuming that the server DPU has a format-specific application conversion module, the client DPU may forward the input data and job settings, which may be in a spool shell form, to the server DPU as described above. Upon receipt of the input data, the server DPU then accordingly converts, with filtering if appropriate, the input data to a native format compatible with the target device 970. This exemplary process may be performed by loading the input data into the format-specific application, e.g., viewer, instructing the viewer to perform a background print to the conversion driver, and having the conversion driver converting the input data to a native format compatible with the printer. The converted native format data 972 may then be encapsulated in a spool shell 980 based on defined job settings, and such spool job 982 may then be transmitted by the server DPU to the target device or a print server 985.

If the server DPU has more than one format-specific application conversion module, the server DPU may select the native format that is efficient 970, typically most efficient, e.g., least RIP processing on the target device, as described above. Feedback notifications, e.g., those indicating the progress of the imaging job (as described above), may also be transmitted by the server DPU to the client DPU. If there is no format-specific application conversion module available at the server DPU, the imaging job may be terminated (not shown), alternatively, if available at the client DPU, such conversion may be performed by the client DPU (not shown).

Figure 10:
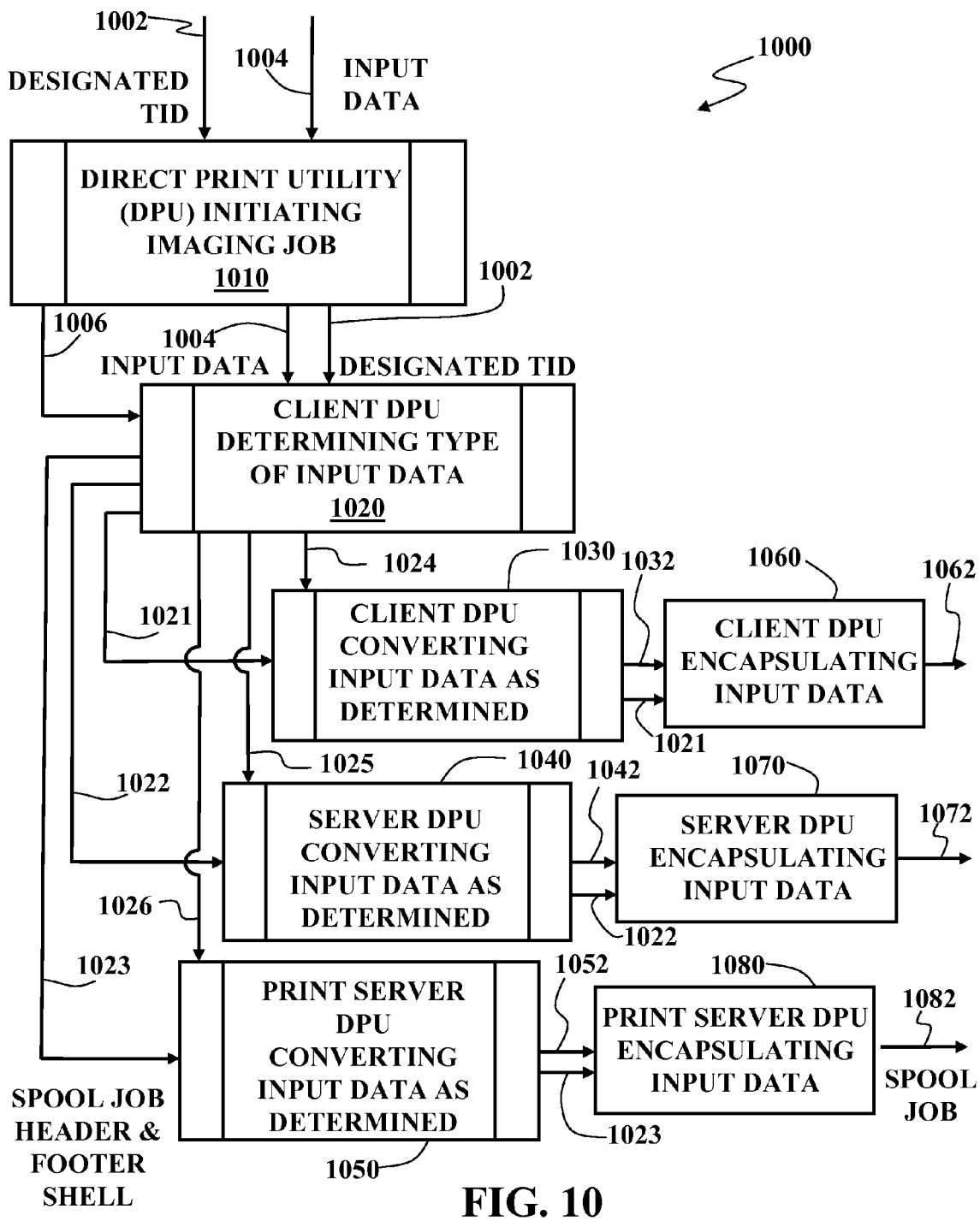
FIG. 10 illustrates an exemplary embodiment where the designated target imaging device and designated input data provide a basis for initiating by a client DPU, an imaging job, according to an embodiment of the present invention.

FIG. 10 illustrates an exemplary embodiment 1000 where the designated target imaging device 1002 and designated input data 1004 provide a basis for initiating 1010, by a client DPU, an imaging job. The initiating sub-process 1010 may generate a spool job header and footer shell 1006 for the designated target imaging device 1002. A client DPU may determine 1020 the format type of the input data 1004 and whether that format is natively supported by the designated target imaging device 1002, for example, by referring to a printer model database relating formats supported by each printer for rendering. If the format is native and available by the client DPU, e.g., hosted by the computer platform hosting the client DPU, a spool job header and footer shell 1021 may be sent to a client DPU converting sub-process 1030 along with the typed input 1024. The client DPU converting sub-process 1030 provides the converted input data 1032 for encapsulating 1060 within the spool job header and footer shell 1021 and may output the encapsulated converted input data 1032 as a spool job 1062.

If the format is not native, not available by the client DPU but available by the server DPU, e.g., hosted by the computer platform hosting the server DPU, a spool job header and footer shell 1022 may be sent to the server DPU converting sub-process 1040 along with the typed input 1025. The server DPU converting sub-process 1040 provides the converted input data 1042 for encapsulating 1070 within the spool job header and footer shell 1022 and may output the encapsulated converted input data 1042 as a spool job 1072.

If the format is not native, not available by the client DPU, not available to the conversion server DPU, but available by the printer server DPU, e.g., hosted by the computer platform hosting the printer server DPU, a spool job header and footer shell 1023 may be sent to the printer server DPU converting sub-process 1050 along with the typed input 1026. The printer server DPU converting sub-process 1050 provides the converted input data 1052 for encapsulating 1080 within the spool job header and footer shell 1023 and may output the encapsulated converted input data 1052 as a spool job 1082.

In those embodiments where format conversions are available at the client DPU, conversion server DPU and printer server DPU, a test of conversion efficiency may be applied in place of a serial test of availability. A faster conversion comparison may include a comparison of the expected speed of converting input data taken together with the expected speed of rasterization at the target imaging device with the expected speed of converting the same input data into a different format, albeit supported by the target imaging device, taken together with the expected speed of rasterization at the target imaging device.

Figure 11:
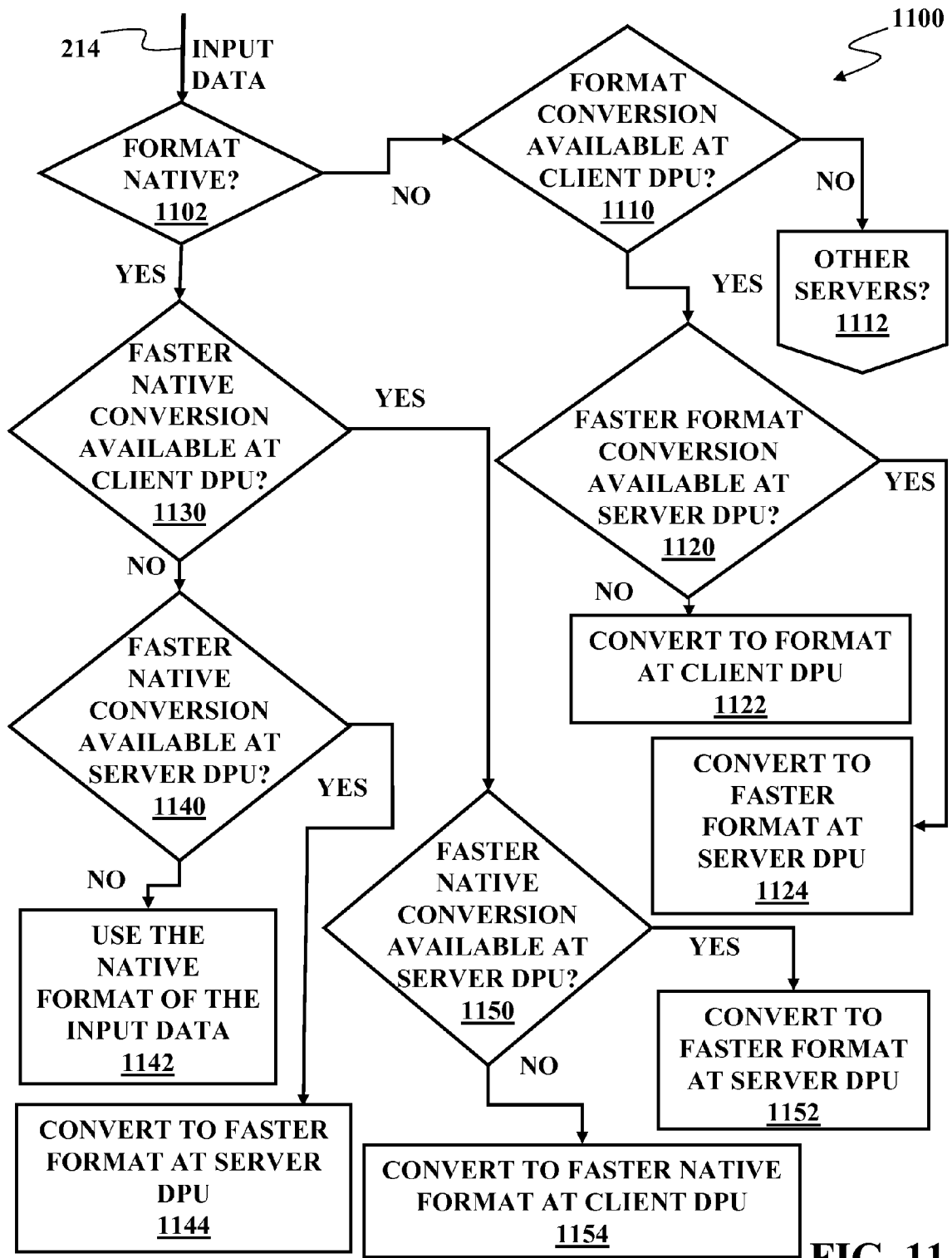
FIG. 11 is an exemplary process illustrating a preference for faster conversion formats, according to an embodiment of the present invention.

FIG. 11 is an exemplary process 1100 illustrating a preference for faster conversion formats where the input data 214 may be tested 1102 for whether its format is native to the designated target imaging device and if not (1102, "no" branch), a test as to whether a format converter is available to the client DPU and if not (1110, "no" branch), then conversion servers may be queried 1112. If the format of the input data 214 is determined to be native to the designated target imaging device (1102, "yes" branch), then a determination 1130 may be made as to whether a faster native conversion is available to the client DPU and if so (1130, "yes" branch), one or more conversion servers may be queried 1150 as to whether there is an even faster native conversion available at a server DPU. If so (1150, "yes" branch), then the input data may be converted to the even faster native format at the server DPU 1152 and if not (1150, "no" branch), then the input data may be converted to the faster native format at the client DPU 1154.

If the determination 1130 of an available faster native converter at the client DPU 1130 yields none (1130, "no" branch), then the client DPU may test whether a server has a faster native converter and if so (1140, "yes" branch), may apply the faster native converter at the server DPU 1144 and if not (1140, "no" branch) the format of the input data is used 1142, considering that there is no faster format converter found at the client DPU and the server DPU. If the format of the input data 214 is determined 1102 to be non-native and a format conversion is available 1110 to the client DPU (1110, "yes" branch), a query may be made 1120 as to the availability at a server of a faster format converter. If the faster format conversion is available at a server (1120, "yes" branch), then the input data is converted to the faster format at that server 1124, and if not (1120, "no" branch), then the input data is converted to the format available at the client DPU 1122. In some embodiments, when there is more than one faster format, the DPU may select the conversion method, which is most efficient in terms of reducing processing demand between the client, server, and/or target device.

While some of the exemplary embodiments have been described in relation to printing, other embodiments of the invention may also apply and include other external input imaging operations which may render an output in either soft or hardcopy format, such as fax, pull scan (e.g., twain driver), file, format conversion, natural language translation, and publish-to-web. In other embodiments, when a conversion service or process is available on both the server and client, the decision on whether to convert the data on either the client or server may be based on the complexity of the input data in collectively reducing processing steps or the collective processing time. Other system embodiments of the invention include, but are not limited to, client/server computing systems running the Microsoft™ Windows™ operating system, Apple™ Macintosh™ Operating System, Linux Operating System, System V Unix Operating Systems, BSD Unix Operating Systems, OSF Unix Operating Systems, IBM™ Mainframe MVS Operating System, and IBM™ AS/4004.

Although this invention has been disclosed in the context of certain embodiments and examples, it will be understood by those of ordinary skill in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of ordinary skill in the art based upon this disclosure. It is also contemplated that various combinations or subcombinations of the specific features and aspects of the embodiments may be made and still fall within the scope of the invention. Furthermore, the various features, including processes, described herein may be embodied in hardware, software, and/or firmware. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above.

I claim:

1. A method of image processing of input data, directed to an imaging device, the method comprising:
generating a spool shell based on a received job setting information for the imaging device;
determining if a received input data is native to the imaging device;
classifying the input data as to whether printer-ready data or device-independent data;
if the input data is not native to the imaging device, then converting the input data into a native converted data, and
if the input data is a printer-ready data then filtering one or more control instructions from the input printer-ready data, and then
generating a spool job by encapsulating the converted data within the generated spool shell; and
if the input data is native to the imaging device, then generating a spool job by encapsulating the input data within the generated spool shell.

2. The method of claim 1 further comprising the step of:
classifying the input data as to whether printer-ready data or device-independent data; and
if the input data is a printer-ready data, then the converted data is at least one of the following: a printer-ready data or a device-independent data.

3. The method of claim 1 wherein the step of determining if the input data is native to the imaging device further comprises reading a device database comprising format information natively supported by the imaging device.

4. The method of claim 1 wherein the step of converting the input data into the native converted data is based on at least one of the following: performance and cost.

5. A method of image processing of input data, directed to an imaging device wherein the input data is in an encapsulated form, the method comprising:
generating a spool shell based on a received job setting information for the imaging device;
determining if a received input data is native to the imaging device;
classifying the input data as to whether printer-ready data or device-independent data;
if the input data is not native to the imaging device, then filtering an old spool shell encapsulating the input data, and then
converting the input data into a native converted data, and
generating a spool job by encapsulating the converted data within the generated spool shell; and
if the input data is native to the imaging device, then generating a spool job by encapsulating the input data within the generated spool shell.

6. The method of claim 5 further comprising:
classifying the input data as to whether printer-ready data or device-independent data; and
if the input data is a printer-ready data, then the converted data is at least one of the following: a printer-ready data or a device-independent data.

7. The method of claim 5 wherein the step of determining if the input data is native to the imaging device further comprises reading a device database comprising format information natively supported by the imaging device.

8. A method of image processing of input data, directed to an imaging device, the method comprising:
generating a spool shell based on a received job setting information for the imaging device;
determining if a received input data is native to the imaging device;
classifying the input data as to whether printer-ready data or device-independent data;
if the input data is not native to the imaging device, then
if the input data is a printer-ready data then filtering one or more control instructions from the input printer-ready data, and then
converting the input data into a native converted data, and
generating a spool job by encapsulating the converted data within the generated spool shell; and
if the input data is native to the imaging device, then
generating a spool job by encapsulating the input data within the generated spool shell.

9. The method of claim 8 further comprising the step of:
classifying the input data as to whether printer-ready data or device-independent data; and
if the input data is a printer-ready data, then the converted data is at least one of the following: a printer-ready data or a device-independent data.

10. The method of claim 8 wherein the step of determining if the input data is native to the imaging device further comprises reading a device database comprising format information natively supported by the imaging device.

11. A method of image processing of input data, directed to an imaging device, the method comprising:
generating a spool shell based on a received job setting information;
determining if a received input data is native to the imaging device;
if the input data is not native to the imaging device, then
converting the input data into a native converted data, wherein the converting the input data to the converted data is allocated between a client and a server, wherein the client is operably coupled to the server, and
if a direct format-to-format conversion process adapted to convert the input data to the converted data is available at the client, then performing the direct format-to-format conversion process at the client;
else if a direct format-specific application conversion process adapted to convert the input data to the converted data is available at the server, then
transmitting, by the client, the input data to the server;
performing the direct format-specific application conversion process at the server;
generating a spool job by encapsulating the converted data within the generated spool shell; and
if the input data is native to the imaging device, then generating a spool job by encapsulating the input data within the generated spool shell.

12. The method of claim 11 wherein the step of transmitting the input data comprises transmitting at least one of the following: received job-setting information and generated spool shell.

13. A method of image processing of input data, directed to an imaging device, the method comprising:
generating a spool shell based on a received job setting information;
determining if a received input data is native to the imaging device;
if the input data is not native to the imaging device, then
converting the input data into a native converted data, and
generating a spool job by encapsulating the converted data within the generated spool shell;
if the input data is native to the imaging device, then
determining if a conversion process is available adapted to convert the input data to a converted faster input data with a faster input format adapted to be processed faster by the imaging device;
if the conversion module is available, then
converting the input data to the converted faster input data by performing the determined available conversion process, and
generating a spool job by encapsulating the converted faster input data within the generated spool shell.

* * * * *